July 4, 1961     H. C. McKINLEY     2,990,588
COMPOSITE HOUSE AND METHOD OF MANUFACTURE
Filed Feb. 18, 1960     7 Sheets-Sheet 1

Fig. 1.

INVENTOR.
Howard C. McKinley,
BY Parker & Carter
Attorneys.

July 4, 1961 H. C. McKINLEY 2,990,588
COMPOSITE HOUSE AND METHOD OF MANUFACTURE
Filed Feb. 18, 1960 7 Sheets-Sheet 6

Fig.11.

INVENTOR.
Howard C. McKinley,
BY Parker & Carter
Attorneys.

United States Patent Office 2,990,588
Patented July 4, 1961

2,990,588
COMPOSITE HOUSE AND METHOD OF MANUFACTURE
Howard C. McKinley, Carlisle, Ind., assignor to Midwest Homes, Inc., Carlisle, Ind., a corporation of Indiana
Filed Feb. 18, 1960, Ser. No. 9,626
8 Claims. (Cl. 20—2)

This invention relates to a house and to the method of building it. It has for one object to provide a house which may be built at a central point in parts and thereafter assembled. It may be shipped any distance desired.

Another object is to provide a house and a method of building it, in which the house is formed of a plurality of integral, separate and individually complete units which are thereafter assembled, if desired, to form a composite house formed of a plurality of the individual separate units.

Another object is to provide, in a house of the type indicated, the necessary utilities so that the house, when assembled, is complete and ready for use as a dwelling.

Other objects will appear from time to time throughout the specification and claims.

The invention is illustrated more or less diagrammatically in the accompanying drawings wherein:

FIG. 6 is a longitudinal section taken at line 6—6 of FIG. 5, illustrating one end of a house unit;

FIG. 7 is a sectional detail taken at line 7—7 of FIG. 12 on an enlarged scale illustrating the point of connection of two house units;

FIG. 8 is a horizontal sectional detail showing the construction of abutting house units and the means for covering and sealing the joint formed at the point where the house units abut each other. It is taken at line 8—8 of FIG. 3;

FIG. 9 is a sectional detail showing an outer portion of a main frame taken at line 9—9 of FIG. 4a;

FIG. 10 is a vertical sectional detail taken at line 10—10 of FIG. 12, showing the heating duct structure of two house units before they have been moved into assembled position;

Like parts are designated by like characters throughout the specification and drawings.

In general the house units will be substantially identical and preferably they will be cut in "rights and lefts." Each unit by the time it is completed for shipment is sealed and closed and could be used in itself without further treatment as a dwelling or other building. In general it is contemplated, however, that two units will be assembled together and will be joined permanently together and mounted on a fixed foundation. Although conceivably the house could be disconnected and the two sections separated and shipped away as units, it is not contemplated normally that the house of this invention is to be a "mobile house." It is intended primarily as a house which is built at a central factory in sections and shipped to a point of use where it is assembled permanently and permanently mounted upon a foundation.

The utilities, such as heating, cooking, bathroom fixtures, plumbing and the like, are installed in one or both of the units at the factory prior to shipment. All that is required after the house has reached its destination and been mounted on its foundation is the assembly of two or more units and the mounting of the assembled house, however many units it may comprise, upon a permanent foundation. Then a water connection, a shower connection and an electric connection are made to the utilities already in place in the house or house units and the device is ready for occupancy, or for other use in case it is not intended to be a dwelling. Obviously some of these units may be dwellings; they may be stores, shops or the like.

Figure 1:
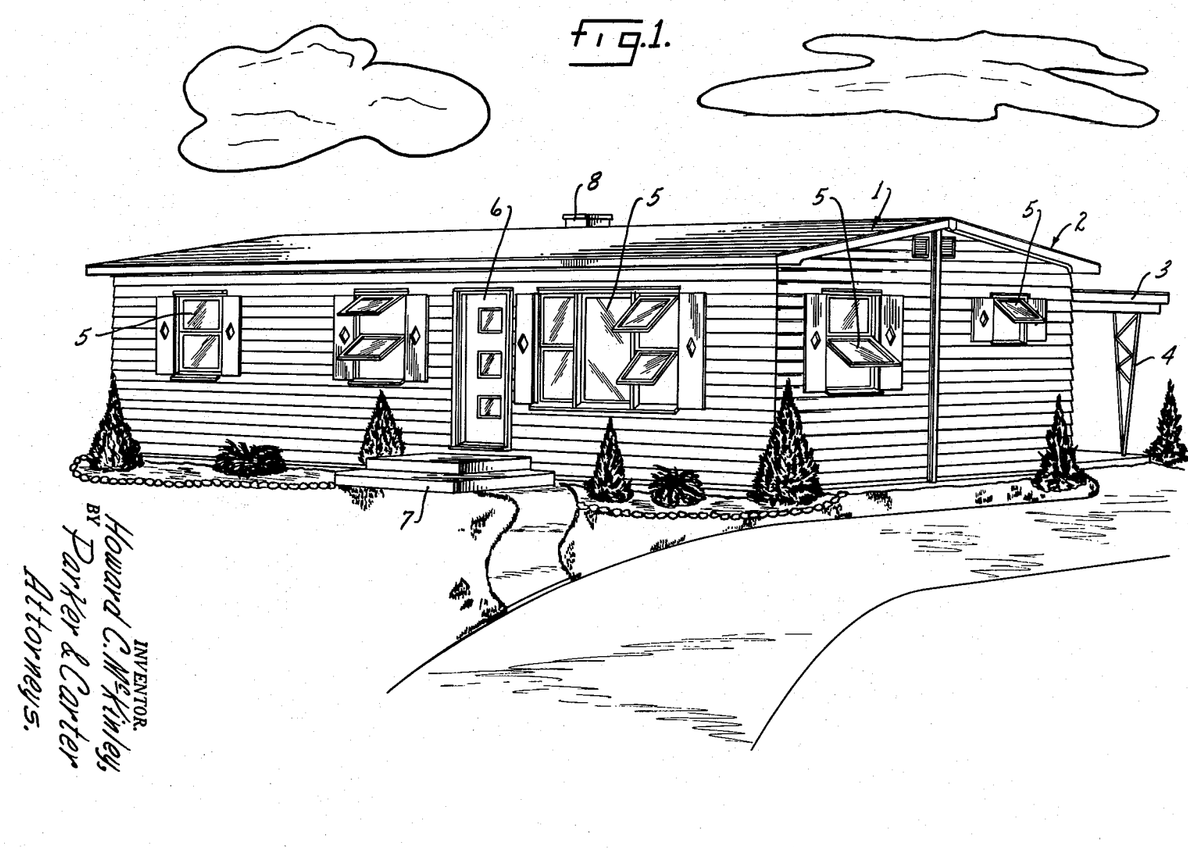
FIG. 1 is a perspective view of one form of the house assembled and mounted upon a suitable foundation.

As shown in FIG. 1, two substantially identical units 1 and 2 have been placed upon a permanent foundation and joined together. A portico or analogous member 3 has been put in place and it is supported by one or more pillars or columns 4. The house as shown in FIG. 1 comprises windows 5 of varying sizes and a door 6. Steps 7 may be provided, if desired, and any landscape treatment considered suitable may be used. A chimney 8 may be provided in one of the sections.

Figure 2:
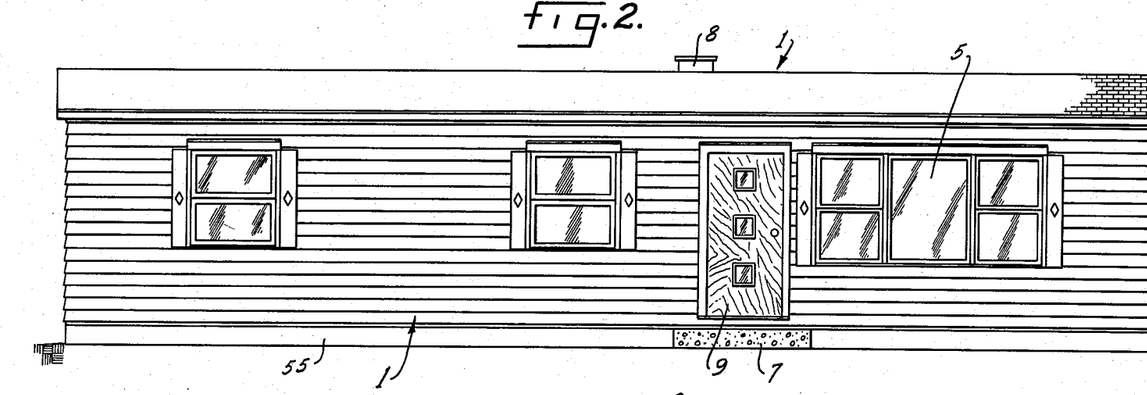
FIG. 2 is a front elevation of the house of FIG. 1.

As shown in FIG. 2, the house unit 1 appears in elevation. The door 9 differs somewhat in detail from the door 6 in FIG. 1 and is thus illustrated merely to indicate that the invention is not limited to any particular or individual arrangement of windows or doors. The numeral 5 has been applied to all of the windows in each section although they differ in shape and size from each other. This again has been done to indicate that the invention is not limited to any particular arrangement of windows or to any size or shape.

Figure 3:
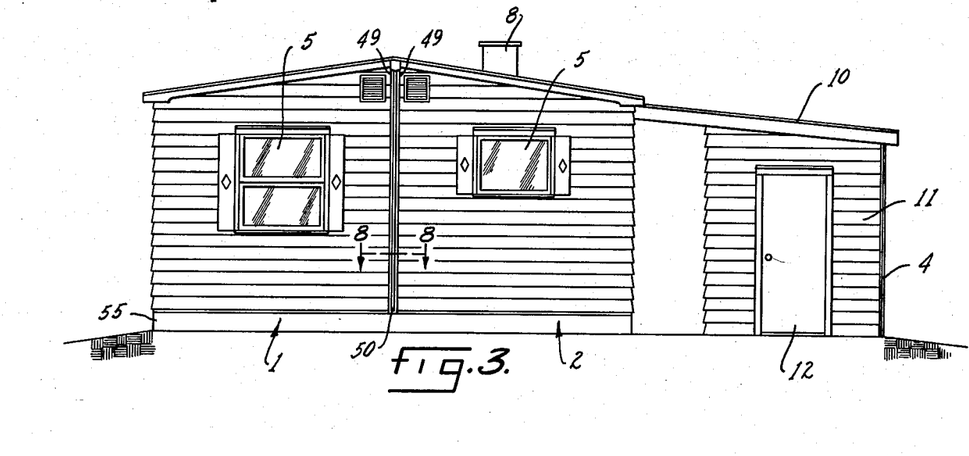
FIG. 3 is an end view of the house of FIG. 1, illustrating a modified detail.

As shown in FIG. 3, instead of the porch 3 supported by the columns 4 there is shown a carport which has a roof 10 extending from the house section 2 to a shed or tool house 11 which is provided with a door 12. The porch of FIG. 1 and the carport of FIG. 3 are shown to indicate that the invention is not limited to any particular arrangement of accessories or added features. Porches, tool houses, breezeways and anything of the sort may be added if desired or may be wholly omitted and the house formed entirely of house units.

Figure 4A:
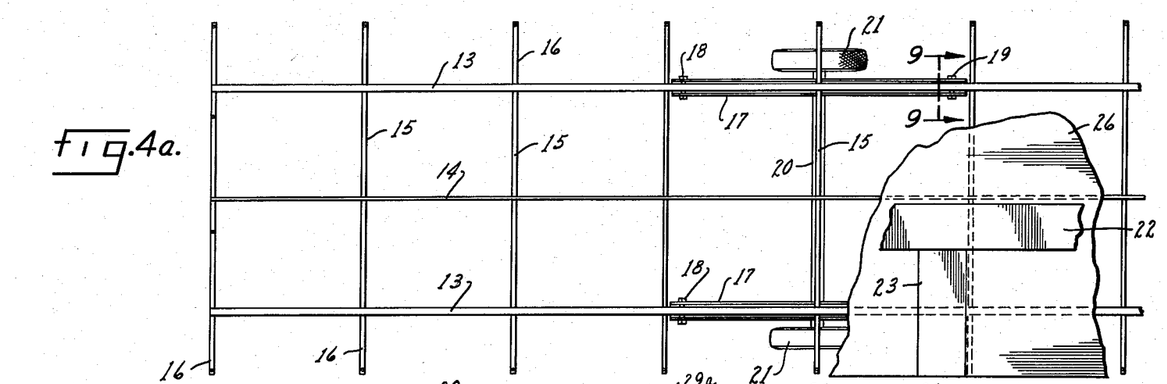
FIG. 4a is a plan view of a house unit illustrating mainly the lowermost framework assembly and illustrating a heating duct arrangement.

The foundation frame of the structure is shown in FIG. 4a. As there shown the framework of each house unit consists of a pair of I-beams 13, 13 and an additional longitudinal strip 14. The I-beams 13 are connected by cross channels 15 and the I-beams are also connected to outriggers 16 which extend laterally beyond the I-beams to approximately the outer edge of the house structure. It will be seen, for example in FIG. 5, that each house unit comprises the main underframe formed of the steel members 13, 15 and 16.

In view of the fact that each house unit is normally transported from the factory to a point of final installation either along a road or partly along a road and partly by railroad, ship, barge or any other means of transportation, a frame is provided to carry a running gear. The framework is indicated in FIG. 4a by the members 17, 17 which are secured to the I-beams 13 as at 18 and 19. These members support an axle 20 upon which wheels 21 are mounted for rotation. The wheels appear in position under a finished unit in FIG. 11.

Figure 4B:
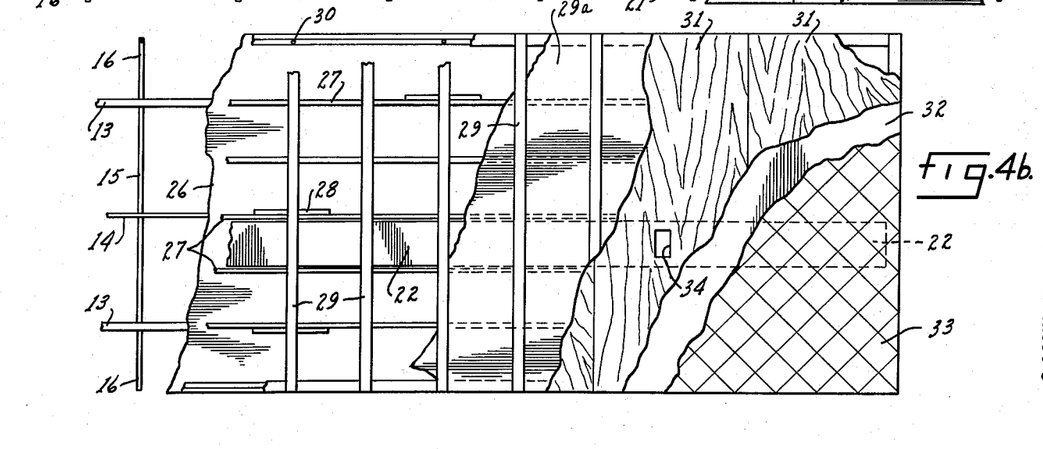
FIG. 4b is a plan view illustrating a portion of the floor of a house unit showing the framework, the heating duct, insulation and the finished floor treatment.

FIG. 4b indicates generally the manner of building the flooring of a unit. Each unit will preferably include a heating duct. Thus each unit has a generally longitudinal heating duct 22 and a lateral duct 23 in communication with the heating duct 22. A shown in FIG. 10, to simplify the problem of joining the two lateral ducts together when house units are joined together to form a complete house, one of the lateral ducts is provided with a slidable duct extension 24 which terminates at its outer end in a flange 25. This flange is secured to the adjacent house section in such a position that the two lateral ducts 23 are in register. The installation is made when the sliding member 24 is in the outward position, indicated in FIG. 10. When thereafter the two house sections are pushed together and secured in a permanent position, the duct 24 merely slides into the lateral duct 23 in which it is orginally positioned. It telescopes inwardly and thus the complete joint is made.

As shown in FIG. 4b a completed floor is installed. Insulation board 26 is preferably applied over the structure formed of the members 13, 14, 15 and 16. It is indicated by the numeral 26 in FIG. 4b. Longitudinal frame members 27 are applied over the insulating board 26. They may run the full length of the house or they may be spliced as at 28. Transverse frame members 29 are applied as desired and the structure is bolted to the outriggers 16 as indicated at 30 in FIG. 4b. Insulation strips 29a are laid between transverse member 29 and overlie the members 27. Plywood or other comparable material 31 is applied over the members 29. Felt padding 32 may be added and finally tile, linoleum or any other flooring material 33 may be put in place over the felt padding to complete the floor. One or more openings 34 will be left through the floor structure for the location of registers for heating.

Each house unit, since it is to be complete in itself, is provided with wall structure and ceiling structure. Thus, as shown for example in FIG. 5, each unit comprises vertical frame members 35, transverse ceiling supporting members 36, a ceiling 37, insulation 37a and roof beams 38. The walls may be of several constructions. As shown they are finished by means of siding 39 and the roof comprises shingles 40 or any comparable material.

Figure 5:
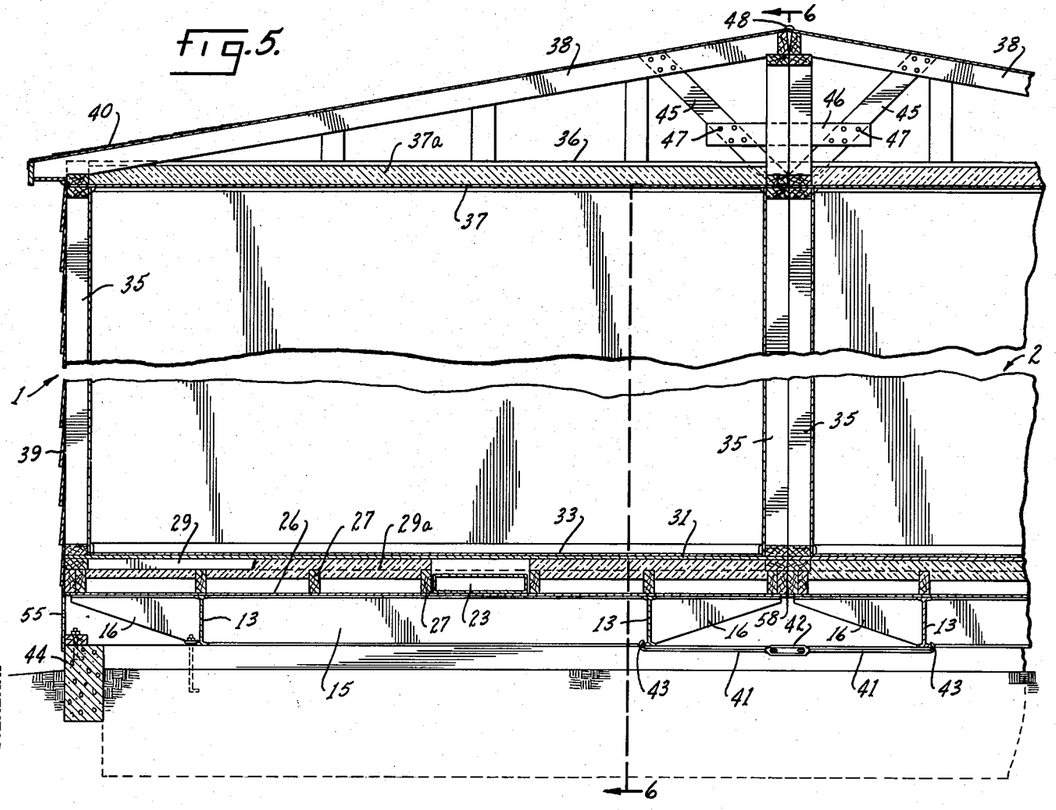
FIG. 5 is a transverse section taken through a completed house formed of two units.

As shown in FIG. 5, which illustrates two housing units joined together, the two units are held together by ties 41 and turnbuckles 42. The ties 41 engage the flanges of I-beams 13 at 43. Usually a number of ties will be used and the house units are drawn together and held together on the foundations 44 upon which they have been placed.

The roof structure of each house section preferably includes angularly disposed members 45 and when the house units are brought together, transverse tying members 46 are secured by nails, screws or bolts 47 so that each adjacent pair of inclined members 45 is held together by a transverse member 46. The vertical members 35 may be fastened together by nailing or otherwise. In practice it has been found that with a firm foundation the house units may be properly held together by the ties 41 and the transverse members 46.

At the point of juncture of the roofs of the two adjoining house units a longitudinal member 48 overlies the two adjacent edges of the roof portions 38 and seals them so that leakage is prevented. This is indicated in FIG. 5.

Where the sides of adjacent house units abut, as shown generally in FIGS. 1 and 3, each house unit is provided with a vertical strip 49 and these vertical strips are partly overlain by a member 50. This member, as shown in FIG. 8, is hollowed as at 51 so that any slight misalignment of the two sections will be compensated for.

Figures 6, 7, 8, 9, 10:
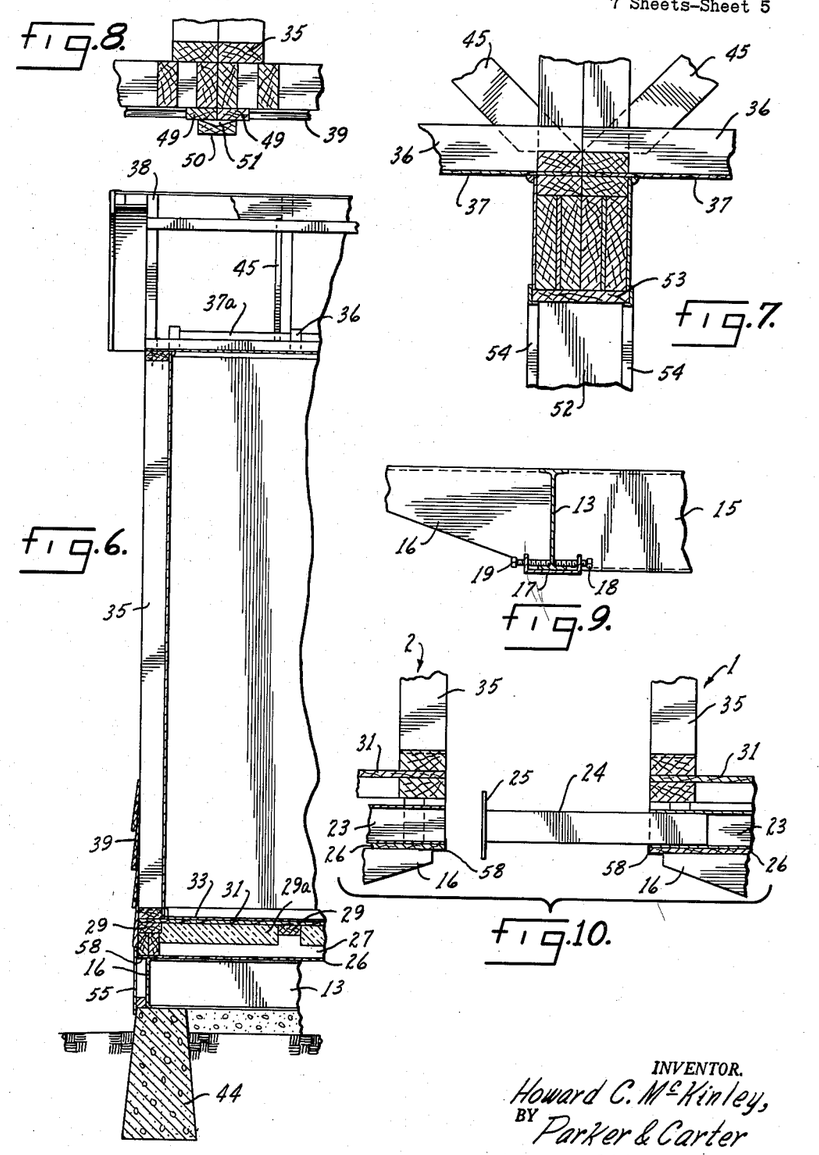

The house sections or units are provided with door openings and when two units are assembled, the door openings in each are brought into register, as shown in FIG. 7. When that has been accomplished a single door frame is installed. As shown in FIG. 7, two house units are illustrated partially. The two have been brought together so that the door opening formed in each now forms a single door opening 52 and this is framed by a single door frame 53 which is finished by edge finishing members 54.

When the house is in position on the foundation 44 one or more finishing strips 55 are put into position and they close the space between the lower siding members 39 and the foundation 44. Finishing members are placed along the house on all sides.

Figure 11:
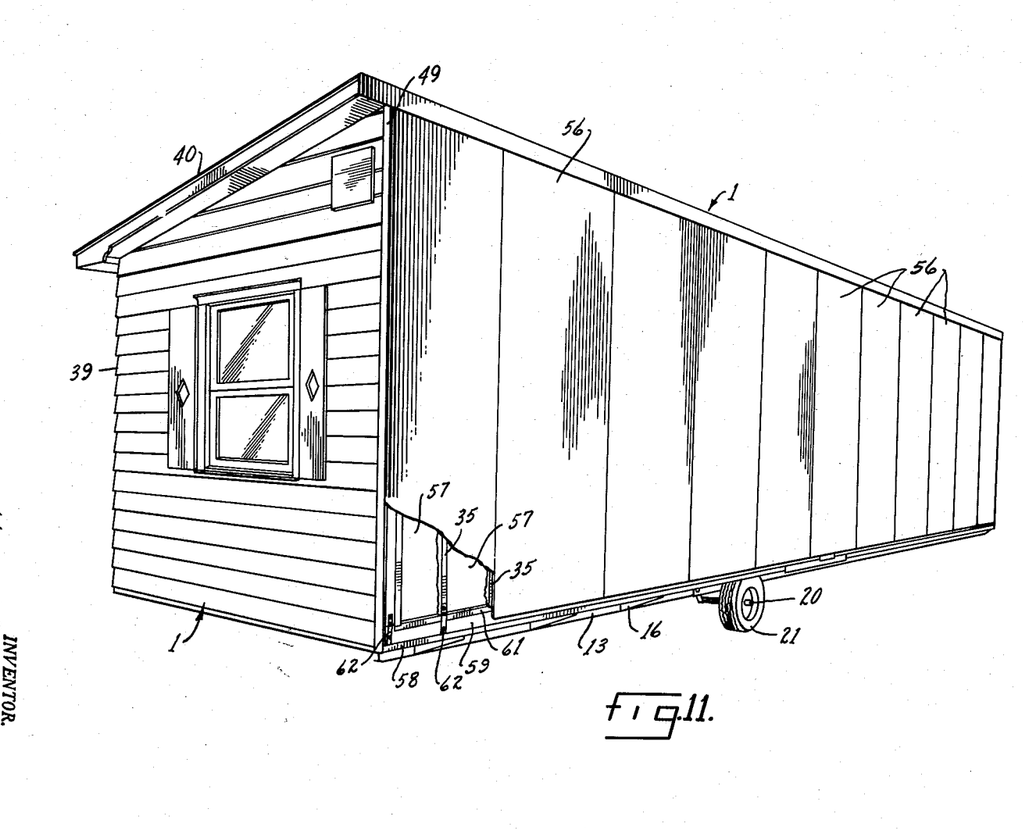
FIG. 11 is a perspective view with parts broken away and parts in section, showing a house unit completed and mounted on a running gear for shipment.

As shown in FIG. 11, a house unit is complete and is positioned on wheels 21 and is ready to be moved to a point of use. The entire exposed side is closed by a sheet-like member 56. For purposes of clarity the members 56 have not been shown in section in the views of the assembled units. This member 56 is preferably of such strength and durability that it could act as a permanent outdoor wall for a house if one chose to live in a single house unit permanently. If that were done the house unit would be installed on a foundation of suitable size and would constitute in itself a complete house. However, if the house unit is to be assembled with another, then the sheetlike members 56 remain in place, except those which span a doorway, such as the door opening 52 of FIG. 7. When two units are assembled together and the door openings brought into register, that part of the sheet 56 which spans the door openings is removed and the rest may be left in place to add further strength and insulation to the composite building.

Whether the house unit is to be used as a dwelling by itself or to be assembled with another unit, insulation 57 is preferably put in place within the wall structure, as shown in FIG. 11 in the broken-away portion of that figure. A metal strip, which is termite-resistant, is placed along the lower edge of the house unit, as shown at 58 in Fig. 11. Above the metal strip, tar paper 59 may be used and thus the bottom of the wall structure, exposed in FIG. 11, is formed by the metal termite-resistant strip and by the tar paper. Upright wall beams 35, which may be present in any desired number and of any desired construction, are fastened to a longitudinal wall member 61 by metal straps 62. These particular details of the wall construction have been found in practice to furnish a strong and durable wall. They may, however, be varied if desired.

Figure 12:
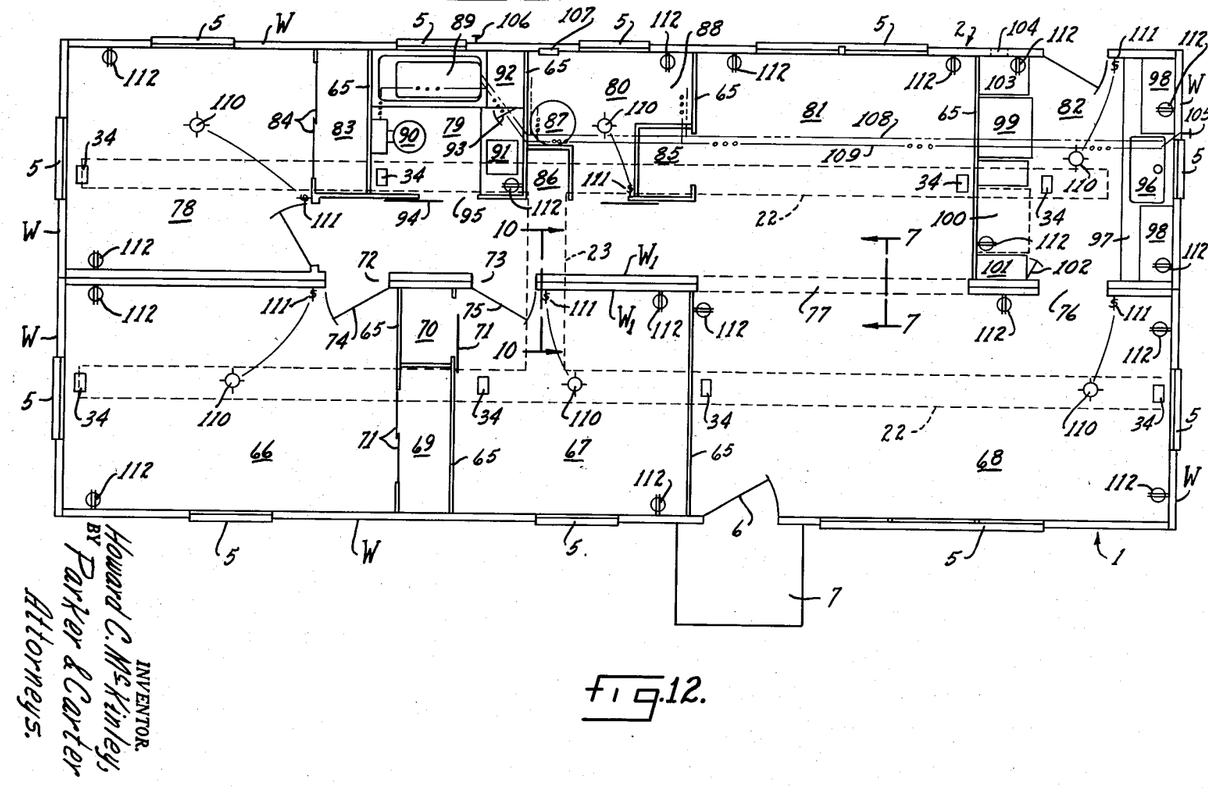
FIG. 12 is a detailed floor plan of the structure of the invention, with utilities and fixtures indicated.

FIG. 12 is a plan view of an installation including two house units which shows the floor plan and the walls in conventional architectural symbols, and it illustrates the utilities and fixtures. The carport, tool house and the like which appear in FIGS. 1 and 3 are omitted in FIG. 12, although they are omitted merely for purposes of clarity and to permit the use of a larger scale in showing the floor plan. As shown, a unit 1 and a unit 2 appear fastened together in the position which they occupy in the assembled house. This position is indicated in perspective in FIG. 1 and in end elevation in FIG. 3. The main walls of the two house units are clear from FIG. 1 and need no further description. The members which appear in the other figures in detail to indicate the precise parts of the structure have been omitted from FIG. 12.

The external walls are indicated generally by the letter W and the walls W1 which appear within the structure are the walls which are actually external walls until two units are joined together to form the composite house. As stated above, either unit of the house may be considered complete within itself and could be lived in alone, although ordinarily a complete composite house is preferably formed by joining together two units, since it is convenient to locate the utilities and fixtures in one unit rather than to duplicate them in the two units and rather than positioning some of the utilities in one unit and some in another. The latter arrangement is within the contemplation of the invention although it is not preferred. In FIG. 12 all of the fixtures and units except lighting and heating outlets are within a single unit, namely the unit 2 of that figure.

Where possible the same numbers have been used in FIG. 12 as in the earlier figures and the description which appears in earlier figures applies to FIG. 12.

Within each unit there are formed a number of partitions 65 which may be arranged at will to form different rooms. As shown in FIG. 12, unit 1 has two bedrooms 66 and 67 and a living room 68. Partitions 65 form these rooms or divide them from the interior of the total unit and closets 69 and 70 are formed, respectively, in bedrooms 66 and 67. Doors 71 may be provided, if desired, or any other partition means may be used. The wall W1 of unit 1 is pierced with door openings 72 and 73 for which doors 74 and 75, respectively, are provided. Another relatively smaller door 76 may be formed in the wall W1 of unit 1 and a larger door 77 may be formed, if desired. The finishing or framing of the door 77 is indicated in detail at FIG. 7.

Unit 2 is divided also by interior walls or partitions 65 and there are thus provided within unit 2 a bedroom 78, a bathroom 79, a utility room 80, a dining room or dining section 81 and a kitchen 82. A closet 83 is formed in communication with the bedroom 78 and may be closed by doors 84. Another closet 85 may be formed which communicates with the dining room or dining space 81. A closet or compartment 86 is formed to receive a heater for heating the house. The heater is not shown for its particular details form no essential part of the invention and many different sorts of heaters might be used. The heater and the space 86 for enclosing it are conveniently located with relation to the heating duct 22 and the cross duct 23. Registers are installed in the openings 34 and thus a complete heating system and heating distribution means are provided.

A water heater 87 may be provided within the utility room 80 and a space 88 is provided within that room for the reception of a washer or other convenient utility.

Within the bathroom 79 is positioned a tub 89, a toilet 90, a lavatory 91 and a linen closet 92 which may be provided with a closing door 93. A door 94 is provided to close the opening 95 to the bathroom.

Within the kitchen 82 is provided a sink 96 which may have adjacent counter space 97 and above the counter space there are provided cabinets or enclosed shelves 98. A range 99 is provided. A space 100 is provided for a refrigerator, which is indicated in dotted lines, and a storage cabinet or closet 101 is indicated which may have a door or other closure 102. 103 is a dishwasher or other utility, and an oven, not shown, is positioned in communication with an exhaust fan 104.

Outside plumbing connections are provided and although they may be formed with each unit, should there be utilities in each unit, they are shown in FIG. 12 only in connection with unit 2 because all of the utilities are positioned within that unit. Thus there is a sill cock or outside connection 105 and a second connection 106. One may serve as an inlet for water and the other as an outlet or drain.

Provision is made for an outside source of electrical current, and such provision is indicated diagrammatically at 107, which is shown as junction box from which communication is made in any suitable manner.

Water pipes are installed throughout unit 2 to connect with the sink 96, the water heater 87, the tub 89, the lavatory 91 and the toilet 90. These pipes are shown in conventional form by the lines 108 and 109.

Electrical connections are provided throughout and there are shown thus in the several rooms overhead lights 110, for each of which is provided a wall switch 111. Wall outlets are shown in the several rooms and they are indicated diagrammatically at 112 wherever they occur. A waste pipe connection is provided from the toilet and the drainage from the toilet, the lavatory and the tub is discharged to this waste pipe which is connected to the sewer system outside of the building.

Each unit is a complete house within itself in the sense that it is fully enclosed by permanent wall members and could be used as a dwelling without attachment to any other unit. It is convenient and may be preferable to use a plurality of units together to form a dwelling of double size compared to that which could be formed by a single unit alone. When this is contemplated at the outset, the plans of the two units will be such that they complement each other when joined together, and thus as shown in FIG. 12 where the joining of two units has been accomplished one of the units includes all of the utilities, such as bathroom, kitchen, heating and the like, and connections are built into both units so that heating originating in a single unit is effective in that unit and is conducted also to the other unit. Obviously more than two units might be joined together, but as in the case of the units shown each would preferably be a unit complete in itself in the sense at least that it is fully floored and roofed and provided with complete walls so that it could be lived in without its addition to any other unit.

Although an operative form of the device has been shown, the invention is not limited to the particular details shown. Many changes may be made in the form, shape and arrangement of parts without departing from the spirit of the invention.

I claim:

1. A building structure including a pair of separate independent building units, said units being somewhat symmetrical and being of a size and shape such that they are transportable on a highway or railroad, said units being completely finished, both inside and out, said units being joined together, as rights and lefts, on a suitable foundation forming a single building structure, each of said units having a rigid supporting framework including longitudinally and laterally extending steel beams lying in the same plane, the walls and floor of each unit being connected to and built on said rigid metal framework, the opposed inner wall of each unit having an aligned opening, a heating duct positioned in each of said openings, said ducts forming the heating connection between units, a slideable duct extension telescoped within the duct in one of said openings, said extension having a flange at the outer end thereof connected to the opposite building unit.

2. The structure of claim 1 further characterized in that the floor structure of each unit includes a layer of insulation positioned on said metal framework, longitudinal frame members positioned on said insulation, lateral frame members extending across said longitudinal frame members, insulation strips positioned on top of said longitudinal frame members and lying between said lateral frame members, wood sheathing positioned on top of said lateral frame members and a finished floor on said wood sheathing.

3. The structure of claim 2 further characterized by longitudinal and lateral heating ducts lying on top of said first layer of insulation and between said frame members, said heating ducts forming the heating system for each unit, and a plurality of vent openings in communication with said heating ducts and with the interior of each unit.

4. The structure of claim 1 further characterized by vertical finishing strips fastened to each unit and covering the opposed ends of each unit when the units are connected together, said finishing strips extending generally the entire distance between the floor and roof.

5. The structure of claim 1 further characterized by lower horizontal finishing strips generally continuous with the outer walls of the units and extending between the lower edge of each wall and the foundation, said finishing strips being generally aligned with and masking said longitudinal and lateral steel beams.

6. The structure of claim 1 further characterized by an axle for each unit mounted on said steel beam framework, said axle being nearer one end of said unit than the other and mounting wheels for moving said unit.

7. The structure of claim 6 further characterized by support beams positioned on each side of said longitudinal beams adjacent the axle.

8. The structure of claim 1 further characterized in that said aligned duct openings are positioned beneath the floor of each of said units.

References Cited in the file of this patent

UNITED STATES PATENTS

| | | |
|---|---|---|
| 1,995,573 | Matthews | Mar. 26, 1935 |
| 2,037,895 | Gugler | Apr. 21, 1936 |
| 2,089,059 | Harley | Aug. 3, 1937 |
| 2,287,229 | Carpenter | June 23, 1942 |
| 2,419,319 | Lankton | Apr. 22, 1947 |
| 2,485,463 | Smith | Oct. 18, 1949 |
| 2,562,050 | Lankton | July 24, 1951 |
| 2,649,627 | Gustin | Aug. 25, 1953 |
| 2,706,313 | Radman | Apr. 19, 1955 |
| 2,887,733 | Kice | May 26, 1959 |

FOREIGN PATENTS

| | | |
|---|---|---|
| 148,469 | Australia | Oct. 1, 1952 |